(No Model.) 2 Sheets—Sheet 1.
G. WILLING.
TIRE AND FELLY CLAMP.
No. 538,361. Patented Apr. 30, 1895.
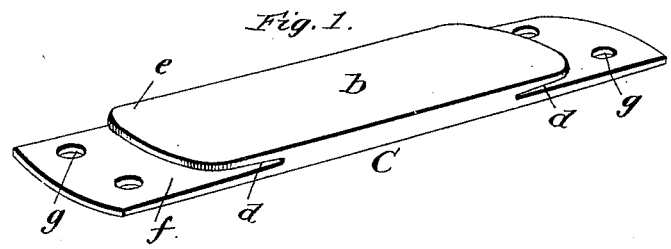
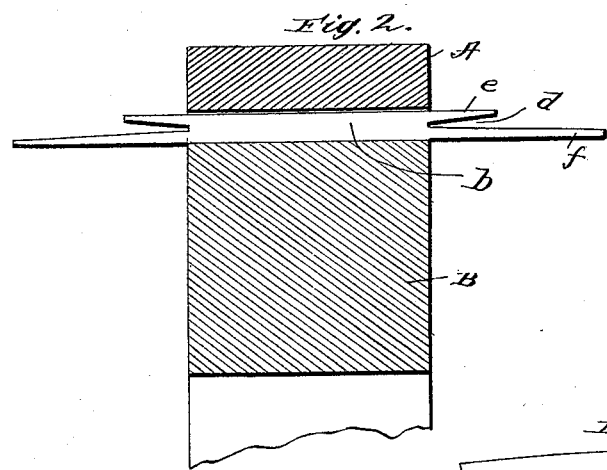
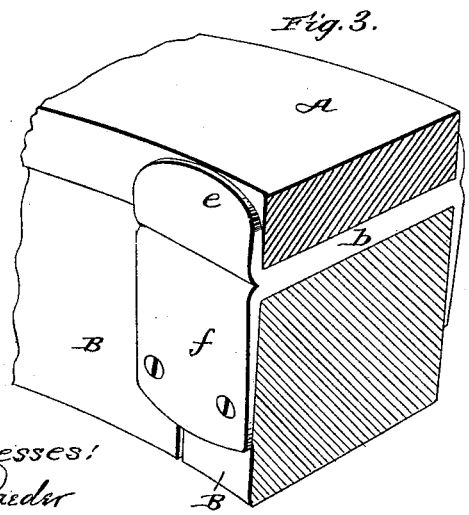
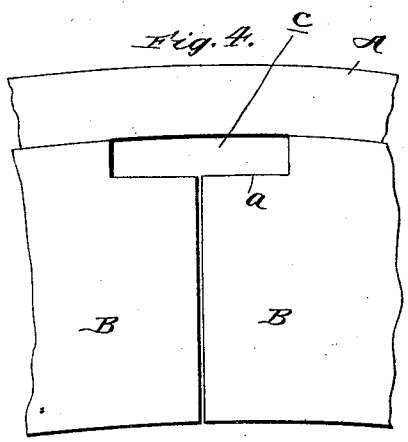
Witnesses:
C. A. Raeder
N. F. Matthews
Inventor
George Willing
By James J. Sheehy
Attorney (No Model.) 2 Sheets—Sheet 2.
G. WILLING.
TIRE AND FELLY CLAMP.
No. 538,361. Patented Apr. 30, 1895.
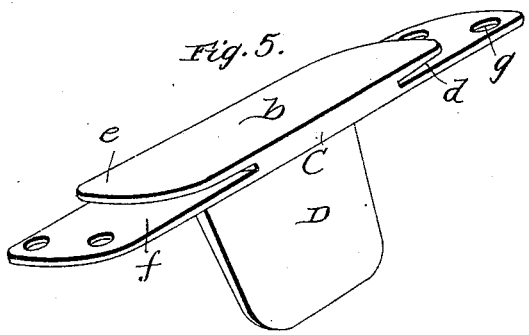
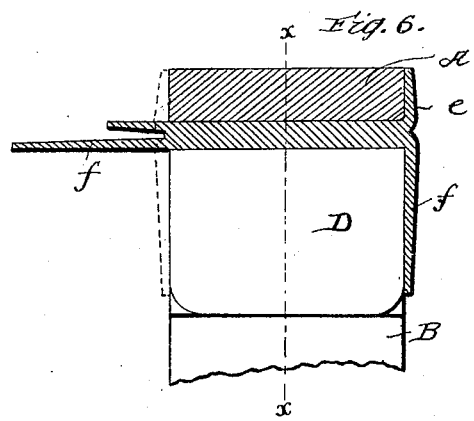
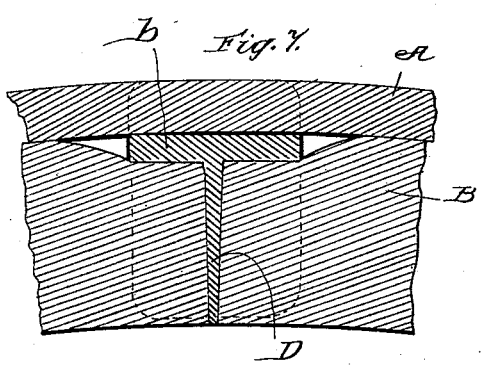

UNITED STATES PATENT OFFICE.

GEORGE WILLING, OF BROKEN BOW, NEBRASKA.

TIRE AND FELLY CLAMP.

SPECIFICATION forming part of Letters Patent No. 538,361, dated April 30, 1895.

Application filed January 16, 1895. Serial No. 535,119. (No model.)

*To all whom it may concern:*

Be it known that I, GEORGE WILLING, a citizen of the United States, residing at Broken Bow, in the county of Custer and State of Nebraska, have invented certain new and useful Improvements in Tire and Felly Clamps; and I do declare the following to be a full, clear, and exact description of the invention, such as will enable others skilled in the art to which it appertains to make and use the same.

This invention relates to a tire and felly clamp, and it has for its object to provide at a minimum expense, a clamp which will be very effective for the purposes designed and one which may be applied to a new or old wheel without the aid of skilled labor; will occupy but little space in storage or transportation, and when used on a new wheel, the pegs so commonly employed for holding the felly sections together at the joints, may be dispensed with.

Other objects and advantages will appear from the following description and claims when taken in connection with the annexed drawings, in which—

Figure 1 is a perspective view of my improved device. Fig. 2 is a cross sectional view of a tire and felly, illustrating my improved device attached and in a position just before being clamped. Fig. 3 is a perspective sectional view of a tire and felly, showing my improved device applied and in an operative position. Fig. 4 is a side view of a part of a tire and fellies prepared to receive my clamp. Fig. 5 is a perspective view of the device in a modified form. Fig. 6 is a cross-sectional view of a tire and my improved clamp constructed according to the modification with a part of the felly in position, and Fig. 7 is a sectional view taken in the plane indicated by the dotted line $x\ x$ on Fig. 6.

Referring by letter to said drawings, and particularly to Figs. 1 to 4, inclusive:—A, indicates the tire and B, two sections of the felly, all of which may be of the form and construction usually employed on vehicle wheels or they may be of any approved character. In these Figs. 1 to 4, I have illustrated my improvements as applied to a new wheel, while in Figs. 5 to 7, I show the improvements as applied to an old wheel, or one in which the tire and felly sections have become loose by wear.

In applying the improvements to a new wheel, it is necessary to rabbet or recess the ends of the felly sections for a sufficient distance contiguous to the tire as shown at $a$, so as to receive the clamp as better shown in Fig. 2, of the drawings.

C, indicates my improved clamp. This clamp is preferably composed of malleable iron although it may be made of other suitable material and comprises a body portion $b$, of flat contour, and of a thickness to snugly fill the opening $c$, made by the rabbeting or recessing of the felly sections, and this body portion is of a length the same or approximately the same as the width of the tire and felly.

The shape which the device assumes after manufacture and before use is shown in Figs. 1 and 2, of the drawings, having a longitudinal slit $d$, flatwise at each end, so as to form a short branch $e$, and a long branch $f$. The long branches are respectively provided with transverse holes $g$, for the reception of the screws or other fastening devices, while the short branches are left plain. In some cases a single hole may be placed in the long branches of the slitted portion although it is preferable to have two holes in each branch, and as the branches are designed to straddle and overlap the contiguous ends of the felly sections, a fastening screw may be passed through the branches and into each section so as to assist in holding the latter together.

I attach importance to the fact that the device is of such a flat contour as it requires such little space in storage and transportation, and it may be manufactured at a very small expense.

In applying the device to a wheel, after forming the opening or recess in a new wheel-felly, or finding a sufficient opening in an old wheel at the felly joints, I place the device in a position shown in Fig. 2, of the drawings, between the tire and felly sections. I then force the long branches $f$, one on each side of the felly sections, and fasten them thereto by means of screws or the like. I then force up or outwardly the short branches e, against the opposite sides of the tire when the whole will firmly clamp the felly sections and also the tire as better shown in Fig. 3, of the drawings.

In the modification shown in Sheet 2 of the drawings, I provide the body of the device and on the side which carries the long branches f, with an integral plate or wedge-shaped flange D. This wedge extends from the longitudinal center of the body and in a plane at right angles thereto, and is of a length equal to the depth of the felly, and of a width equal to the width of the felly. This construction is particularly designed for use upon old wheels where the felly sections have become very loose, and in applying the same, I first cut off the pegs or tenons at the felly joints and force the device between the felly sections and tire with the wedge between the ends of the felly sections, after which the branches of the slitted portion are bent and secured in position as before described.

By placing a number of these clamping devices upon an old wheel, both the felly sections and the tires will be forced as tightly as they were when the wheel was new.

Having described my invention, what I claim is—

1. The tire and felly clamp described, comprising the body portion slitted longitudinally and flatwise at opposite ends and in the direction of its greatest width so as to form the short branches e, and the long branches f, at each end, and one set of branches having holes for the reception of screws or the like, whereby the whole may be fastened to the felly, substantially as specified.

2. The tire and felly clamp described, comprising the body portion slitted at opposite ends so as to form a short branch and a long branch at each end, and one set of branches having holes for the reception of screws or the like, and a wedge extending at right angles or approximately so in a longitudinal plane from the center of the body on the side of the long branches, substantially as specified.

In testimony whereof I affix my signature in presence of two witnesses.

GEORGE WILLING.

Witnesses:
WILBUR HOLCOMB,
FLETCHER DODD.